(No Model.)
H. B. WYMAN.
MINING MACHINE.
No. 455,824.      Patented July 14, 1891.
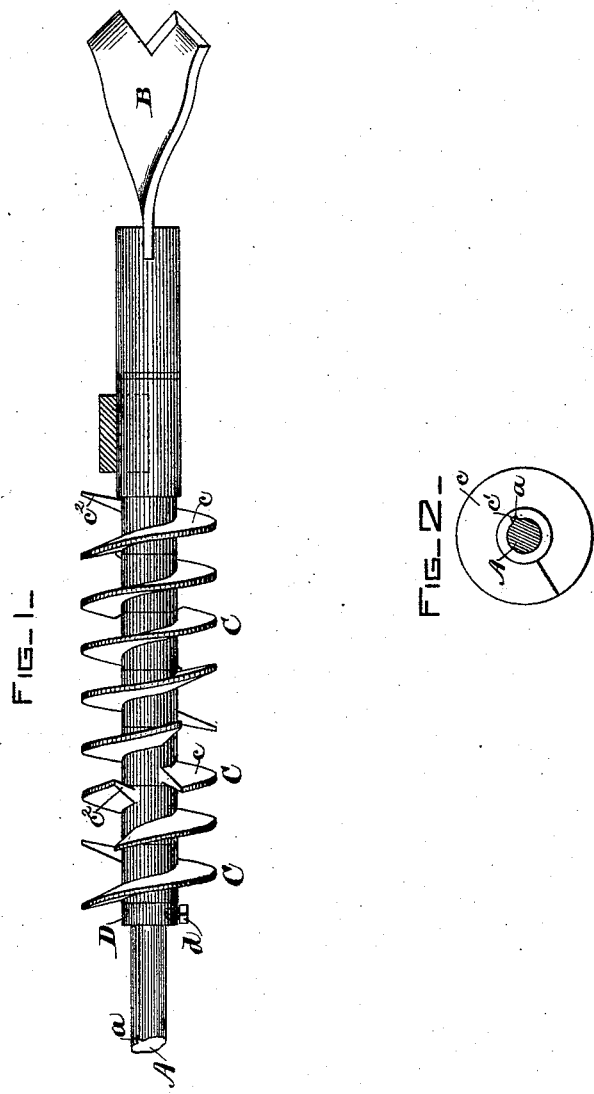
WITNESSES:
Arthur P. Knight
G. O. Blackwell
INVENTOR:
Horace B. Wyman
by Bentley Knight
ATTYS.

UNITED STATES PATENT OFFICE.

HORACE B. WYMAN, OF DOVER, NEW HAMPSHIRE, ASSIGNOR TO THE THOMSON-VAN DEPOELE ELECTRIC MINING COMPANY, OF MAINE.

MINING-MACHINE.

SPECIFICATION forming part of Letters Patent No. 455,824, dated July 14, 1891.

Application filed March 23, 1891. Serial No. 385,970. (No model.)

*To all whom it may concern:*

Be it known that I, HORACE B. WYMAN, a citizen of the United States, residing at Dover, in the county of Strafford and State of New Hampshire, have invented a certain new and useful Improvement in Mining-Machines, of which the following is a specification.

My invention relates to mining-machines, and more particularly to the construction of a propelling-screw for removing the borings of a mining-drill.

The main object of my invention is to so form the propelling-screw as to enable it to break up the excavated material as it is fed back from the drill by the screw, so as to prevent its binding and clogging between the screw-threads. The borings are also thereby broken up into available fragments and there is less grinding into culm or slack than with the ordinary screw.

Further advantages of my construction are that it enables the propelling-screw to be built up in any required length, and to be readily and cheaply repaired when damaged in part.

The objects are obtained by forming the propelling-screw of a series of screw-sections, strung and feathered on a central core or spindle and clamped in place, and having their screw portions arranged so as to form when assembled a discontinuous screw-thread having a number of gaps forming teeth for the purpose of breaking up the coal. This construction is illustrated in the accompanying drawings, in which—

Figure 1 is a side view of the drill and the propelling-screw. Fig. 2 is a transverse section of the screw.

The bit-stock or drill-spindle A carries in its end the bit or drill B, and is provided along that portion which is to take the propelling-screw with a continuous spline or feather $a$. A number of screw-sections C, each having a screw portion $c$ and a groove $c'$ for engaging with the feather $a$, are strung in said stock or spindle, and are clamped in place by a collar D, fastened by set-screw $d$.

The screw portions $c$ on the screw-sections are so arranged that when the whole is assembled gaps are left in the screw-thread. The advancing edges $c^2$ of the separate screw portions then form teeth which serve to cut and break the coal fed back between the threads.

By reference to Fig. 1 it will be seen that the teeth or edges $c^2$ are arranged in different angular relations to the feather and groove, so that, although the screw portions are alike, they are angularly displaced or separated to form a discontinuous screw with cutting-teeth, and, moreover, these cutting-teeth and the gaps in advance thereof are arranged spirally, so that a continuous spiral passage for the exit of the material is formed, and the cutting-teeth come successively into action in the most advantageous manner.

What I claim as new, and desire to secure by Letters Patent, is—

1. The combination of the drill-bit and spindle, the screw-sections strung on said spindle and engaging therewith by a feather-and-groove device extending longitudinally of the spindle, the screw-sections having cutting ends which are located in different angular relations to the feather-and-groove device in the different sections, so as when assembled to leave gaps between the screw-sections.

2. The combination of the drill-bit and spindle, the screw-sections strung on said spindle and engaging therewith by engaging devices extending longitudinally of the spindle, the screw-sections having cutting ends which are located in different angular relations to the said engaging devices in the different sections, so as when assembled to leave gaps between the screw-sections.

In witness whereof I have hereunto set my hand, this 18th day of March, 1891.

HORACE B. WYMAN.

Witnesses:
CHAS. S. CORTLAND,
F. E. GARSIDE.